US011908198B2

(12) United States Patent
Yang et al.

(10) Patent No.: US 11,908,198 B2
(45) Date of Patent: Feb. 20, 2024

(54) CONTEXTUALIZATION AND REFINEMENT OF SIMULTANEOUS LOCALIZATION AND MAPPING

(71) Applicant: Pony AI Inc., Grand Cayman (KY)

(72) Inventors: Mengda Yang, Sunnyvale, CA (US); Weixin Jiang, Guangzhou (CN); Zheng Yan, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 223 days.

(21) Appl. No.: 17/205,314

(22) Filed: Mar. 18, 2021

(65) Prior Publication Data

US 2022/0300745 A1 Sep. 22, 2022

(51) Int. Cl.
*B60W 60/00* (2020.01)
*G06V 20/58* (2022.01)

(52) U.S. Cl.
CPC .......... *G06V 20/58* (2022.01); *B60W 60/001* (2020.02); *B60W 2420/52* (2013.01)

(58) Field of Classification Search
None
See application file for complete search history.

(56) References Cited

U.S. PATENT DOCUMENTS

| 2021/0141093 | A1* | 5/2021 | Kim | G01S 17/89 |
| 2021/0142077 | A1* | 5/2021 | Cox | G06V 20/10 |
| 2021/0157330 | A1* | 5/2021 | Tran | G06V 10/82 |
| 2021/0183139 | A1* | 6/2021 | Richert | G06T 15/30 |

* cited by examiner

*Primary Examiner* — Idowu O Osifade

(57) ABSTRACT

A computing system includes one or more processors and a memory storing instructions that, when executed by the one or more processors, cause the system to perform operations. The operations include obtaining sensor data from a sensor of a vehicle, the sensor data including point cloud frames at different positions, orientations, and times, the sensor data used to generate a map, determining a position and an orientation of the sensor corresponding to a capture of each of the point cloud frames according to a simultaneous localization and mapping (SLAM) algorithm, and depicting, on an interface, a graphical illustration of the determined positions at which the point cloud frames were captured.

20 Claims, 13 Drawing Sheets

900

Computing System 121

Hardware Processors 122

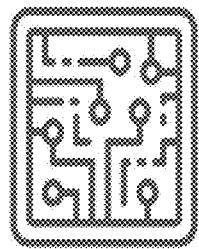

Obtain sensor data from a sensor of a vehicle, the sensor data including point cloud frames at different positions, orientations, and times, the sensor data used to generate a map 902

Determine a position and an orientation of the sensor corresponding to a capture of each of the point cloud frames according to a simultaneous localization and mapping (SLAM) algorithm 904

Depict, on an interface, a graphical illustration of the determined positions at which the point cloud frames were captured 906

Machine-Readable Storage Media 114

FIGURE 9

CONTEXTUALIZATION AND REFINEMENT OF SIMULTANEOUS LOCALIZATION AND MAPPING

BACKGROUND

High accuracy mapping using global position satellite (GPS), or global navigation satellite system (GNSS) navigation alone, may be hampered due to signal outages and obstructions. In order to address the shortcomings of GPS, during the past two decades, simultaneous localization and mapping (SLAM) has been used in an effort to both build a map of an environment surrounding a robot and localize the robot within the map. Outputs of SLAM may include locations and trajectories of a vehicle conducting the mapping and probability distributions of the locations and trajectories. However, the outputs may be difficult to validate or analyze without further context regarding specific frames of sensor data and constraints used to obtain the outputs.

SUMMARY

Described herein, in some embodiments, is a computing system that generates a map according to a SLAM algorithm, while providing additional context regarding computations of the SLAM algorithm. In some embodiments, a computing system that generates a map may be separate from a computing system that provides additional context regarding the SLAM algorithm through an interface. In some embodiments, the computing system includes one or more hardware processors, and a memory storing instructions that, when executed by the one or more processors, cause the computing system to perform obtaining sensor data from a sensor of a vehicle. The sensor data includes point cloud frames at different positions, orientations, and times. The sensor data may be used to generate a map. The instructions further cause the computing system to perform determining a position and an orientation of the sensor corresponding to a capture of each of the point cloud frames according to a simultaneous localization and mapping (SLAM) algorithm. The instructions further cause the computing system to perform depicting, on an interface, a graphical illustration of the determined positions at which the point cloud frames were captured.

In some embodiments, the graphical illustration includes trajectory points indicating the determined positions and lines connecting the trajectory points to indicate time relationships or constraints between the trajectory points.

In some embodiments, the trajectory points are depicted at different stages of the SLAM algorithm, the stages including after capture of the sensor data, after GNSS-IMU post processing, and after point cloud registration.

In some embodiments, the instructions further cause the computing system to perform: receiving a selection of a trajectory point of the trajectory points; and displaying a point cloud frame corresponding to the trajectory point.

In some embodiments, the instructions further cause the computing system to perform: displaying a second point cloud frame resulting from a registration of the point cloud frame according to a source point cloud.

In some embodiments, the instructions further cause the computing system to perform: receiving a selection of a constraint; and displaying data of the constraint, the data indicating second trajectory points subject to the constraint and whether the constraint is a soft constraint or a hard constraint.

In some embodiments, the instructions further cause the computing system to perform: displaying information of the trajectory points connected by the constraint and associated with the constraint; displaying point cloud frames corresponding to the trajectory points; and displaying a resulting point cloud frame generated from a merging or an aligning operation of the point cloud frames corresponding to the trajectory points.

In some embodiments, the resulting point cloud frame is generated under a condition that the constraint is only partially satisfied; and the instructions further cause the one or more processors to perform: displaying a second resulting point cloud frame generated from a merging or an aligning operation of the point cloud frames under a second condition that the constraint is fully satisfied.

In some embodiments, the instructions further cause computing system to perform: receiving an indication to delete a constraint of the constraints; redetermining the position and the orientation of the sensor corresponding to the capture of each of the point cloud frames according to the deleted constraint; and depicting, on an interface, a graphical illustration of the redetermined positions at which the point cloud frames were captured.

In some embodiments, the instructions further cause the computing system to perform: generating the map according to the sensor data and the determined position and orientation of the sensor; and transforming the map according to the redetermined position and the orientation of the sensor and the removal of the constraint.

The transformed map and/or the generated map above may be utilized by the computing system or transmitted to a separate computing system, such as a computing system on a vehicle, to perform navigation on the vehicle. For example, the vehicle may perform navigation while avoiding obstacles shown on the transformed map and/or the generated map, while navigating on roadways or drivable paths shown on the transformed map and/or the generated map.

Various embodiments of the present disclosure also provide a method implemented by the computing system as described above. Various embodiments of the present disclosure also provide instructions, stored in a memory or non-transitory storage media, that cause processors in the computing system to perform the methods above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2A illustrates an example of generating a pose graph.

FIG. 2B illustrates an example of a loop closure detection.

FIG. 9 illustrates a flowchart of a method of the computing system, in accordance with an example embodiment of the present disclosure and as shown in accordance with FIGS. 1A-1B, 2A-2B, 3A-3B, and 4-8.

DETAILED DESCRIPTION

A solution obtained from SLAM may include, for example, locations and trajectories, poses, and/or attitudes of a sensor or a vehicle used to obtain frames of data, such as point cloud data, along with probability distributions of the locations and trajectories, poses, and/or attitudes. However, viewing mere numbers of such a solution may not provide a necessary context to determine a validity of the solution. Thus, additional context regarding how the solution was obtained, and/or how changes in constraints may affect the solution, may enhance and enrich a capability to analyze and/or refine the solution. To facilitate validation and/or assessment of the solution, a computing system may provide, on an interface, relevant point cloud frames and/or files, and relevant parameters, while presenting a process of how the parameters were obtained at different stages in SLAM. The different stages may include, for example, parameters obtained by the sensors prior to performing SLAM, following GNSS-IMU post-processing, following point cloud registration and optimization, and following further customization. The computing system may be a same computing system or remote from a computing system that perform SLAM computations and obtains SLAM solutions. In the FIGURES below, the computing system performing SLAM computations and obtaining SLAM solutions is shown as a same computing system that presents information on an interface, but in some embodiments, a different computing system may present information on an interface from a computing system that obtains SLAM solutions. The computing system, in some embodiments, may be on a vehicle or offloaded to a site remote from the vehicle, while receiving Lidar sensor data from the vehicle.

Figure 1A:
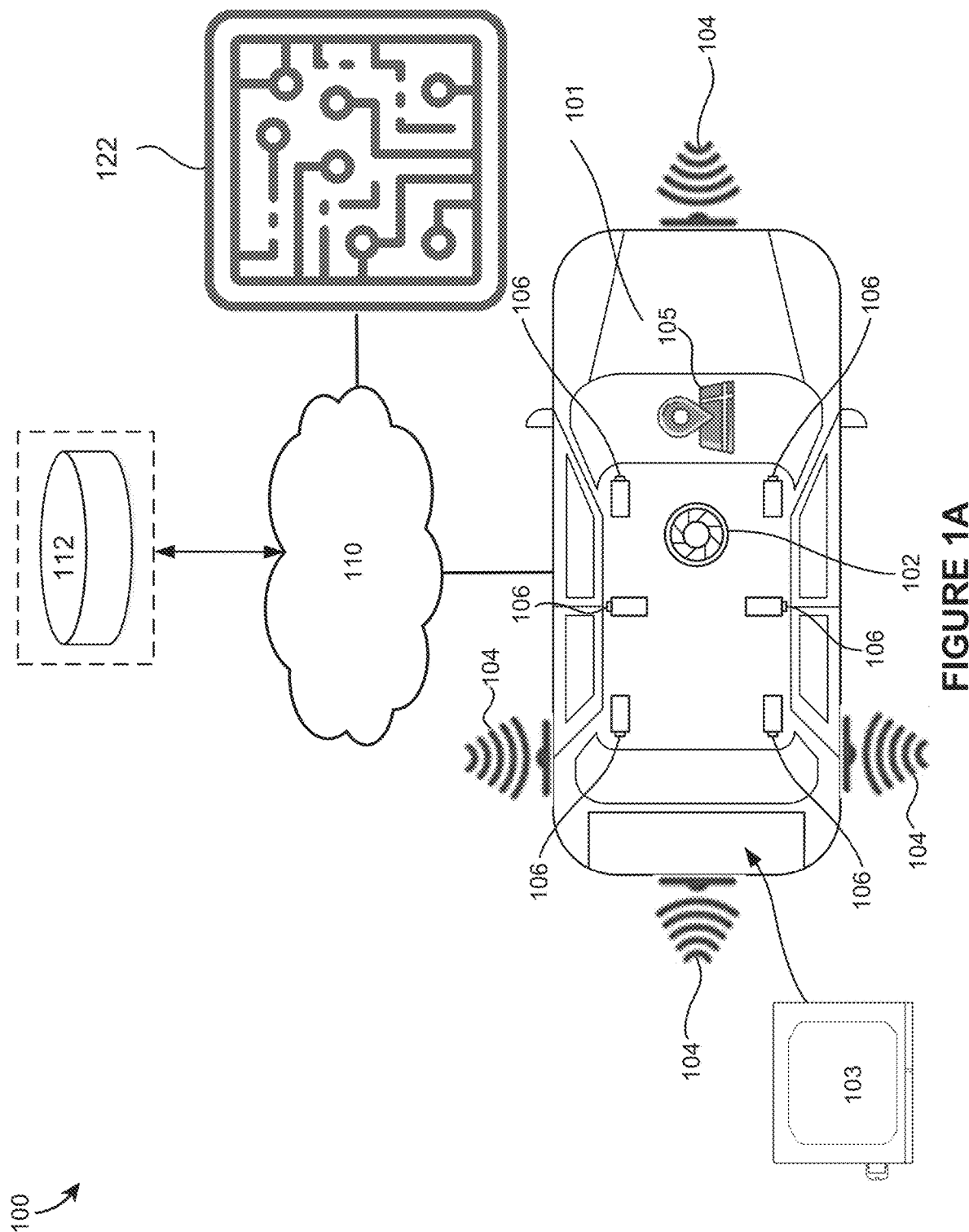
FIG. 1A illustrates an example environment of a computing system that acquires sensor data and maps surroundings according to an algorithm such as SLAM, while presenting contextual data of the algorithm, according to an embodiment of the present disclosure.

FIG. 1A illustrates an example environment 100 of a system that presents additional contextual information of a SLAM solution, according to an embodiment of the present disclosure. In FIG. 1A, a vehicle 101 such as an autonomous vehicle may include sensors such as Lidar sensors 102, an inertial measurement unit (IMU) 103, radar sensors 104, a GPS or GNSS sensor (hereinafter "GPS sensor") 105, cameras 106, accelerometers, gyroscopes, magnetometers, and FIR (far infrared) sensors to detect and identify objects in a surrounding environment. In some embodiments, the IMU may include accelerometers and gyroscopes, and optionally, magnetometers. The sensor data may include pictorial or image data such as pictures or videos, audio data, audiovisual data, timestamp data, and/or other data indicating a position and/or pose of the vehicle 101 captured in either real-time or with a time delay. For example, data from the Lidar sensors 102, the IMU 103, the GPS sensor 105, and the timestamp data can be used to localize the vehicle 101 at different times while performing SLAM computations and/or providing solutions of the SLAM computations to a user. The vehicle 101 can also include myriad actuators to propel and navigate the vehicle 101 in the surrounding based on the generated map. Such actuators may include, for example, any suitable electro-mechanical devices or systems such as actuators including drive-by-wire (DBW) actuators to control a throttle response, a braking action, a steering action, or other navigation actions.

The environment 100 may also include one or more servers 112 accessible to a computing system 121. The computing system 121 may be integrated into the vehicle 101 or may be remote from the vehicle 101, but still receiving sensor data from the vehicle 101 and/or other vehicles. The one or more servers 112 may store frames of data from the sensors of the vehicle 101. In some embodiments, the one or more servers 112 may store integrated or fused data from the sensors. The one or more servers 112 may be accessible to the computing system 121 either directly or over the communication network 110. In some instances, the one or more servers 112 may include federated data stores, databases, or any other type of data source from which data may be stored and retrieved, for example. In some implementations, the one or more servers 112 may include point clouds which may be registered, or post-processed global navigation satellite system (GNSS)-inertial navigation system (INS) data. In general, a user operating a computing device can interact with the computing system 121 over the communication network 110, for example, through one or more graphical user interfaces and/or application programming interfaces. The computing system 121 may include one or more processors such as a graphics processing unit (GPU) or a central processing unit (CPU). The computing system 121 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the computing system 121 may include multiple types of processing units (e.g., GPUs, central processing units (CPUs), application-specific integrated circuits (ASICs), field-programmable gate arrays (FPGAs), etc.) potentially distributed across multiple computing devices and in communication with one another via one or more communication buses. The functions of the computing system 121 will be described further in the subsequent figures. Engines/program modules as described below can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Figure 1B:
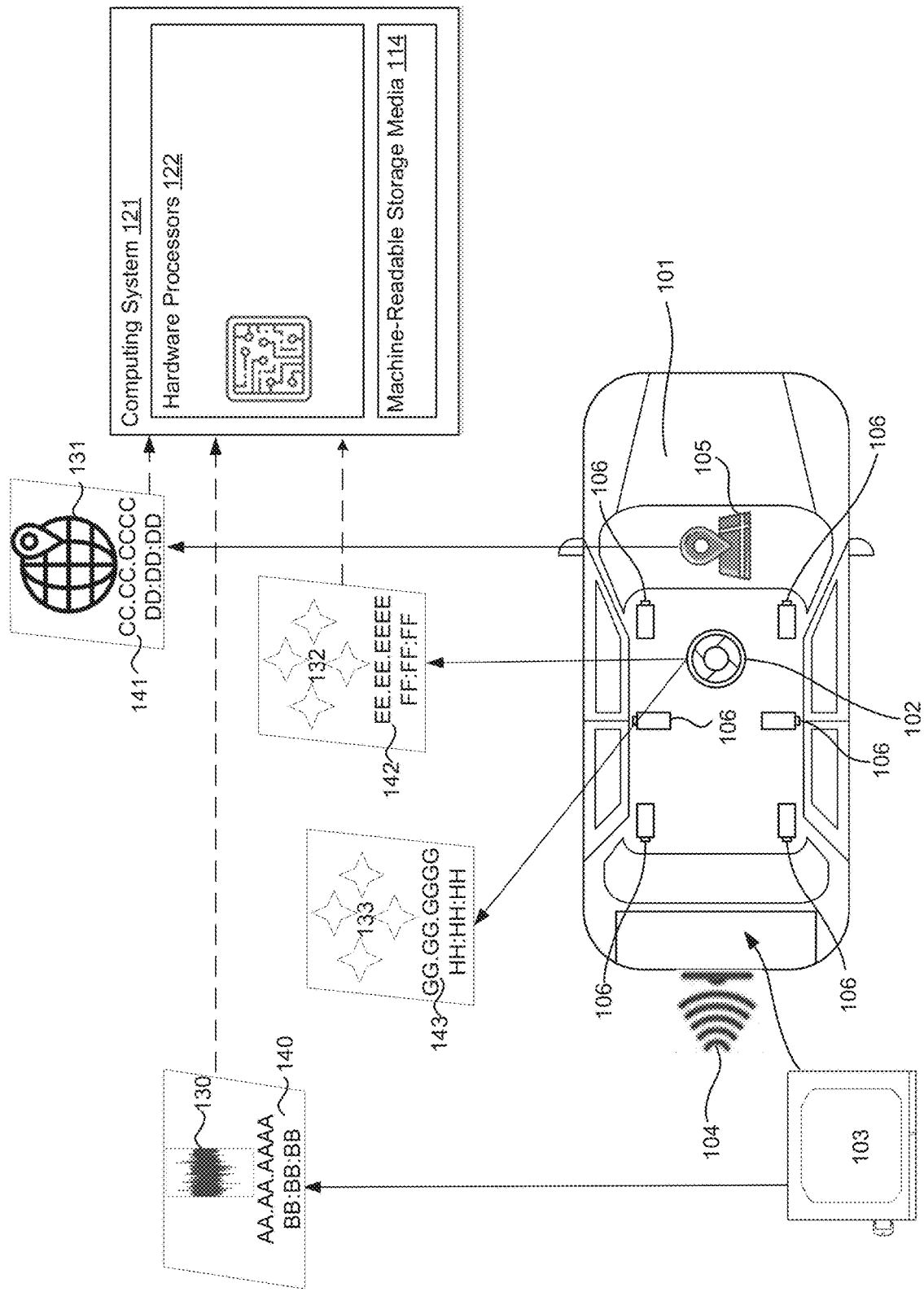
FIG. 1B illustrates a hybrid data flow and block diagram that depicts a computing system acquiring sensor data, in accordance with an example embodiment of the present disclosure.

FIG. 1B illustrates a hybrid data flow and block diagram that illustrates a process of acquiring sensor data, performing SLAM computations, and providing, additional context regarding the SLAM computations, in accordance with an example embodiment. In FIG. 1B, the computing system 121 may include one or more hardware processors 122, which may include, at least, a process engine 124. The computing system 121 may include machine-readable storage media 114 storing instructions that, when executed, cause the computing system 121 to acquire the sensor data, perform the SLAM computations, and provide additional context regarding the SLAM computations. In FIG. 1B, sensor data captured by sensors of the vehicle 101 may include point cloud frames 132 and 133 having respective timestamps 142 and 143 and captured by the Lidar sensors 106, GNSS data 131 having a timestamp 141 and captured by the GPS sensor 105, and IMU data 130 having a timestamp 140, and captured by the IMU 103. The GNSS data 131 and the IMU data 130 may be fused or synchronized with the point cloud frames 132 and 133 in order to further validate or refine a location and pose of when the point cloud frames 132 and 133 were captured, and/or introduce additional constraints into the point cloud frames 132 and 133. The point cloud frames 132 and 133 may include any of 2D, 3D, and/or 2D/3D fused Lidar data. Two point cloud frames are shown for illustration, but any number of point cloud frames may be generated. In some embodiments, the point cloud frame 132 may be augmented with features from the point cloud frame 133 to elucidate certain features. Further details regarding point cloud registration are described in application Ser. No. 17/124,444, filed on Dec. 16, 2020, which is hereby incorporated by reference in its entirety.

Figure 2A:
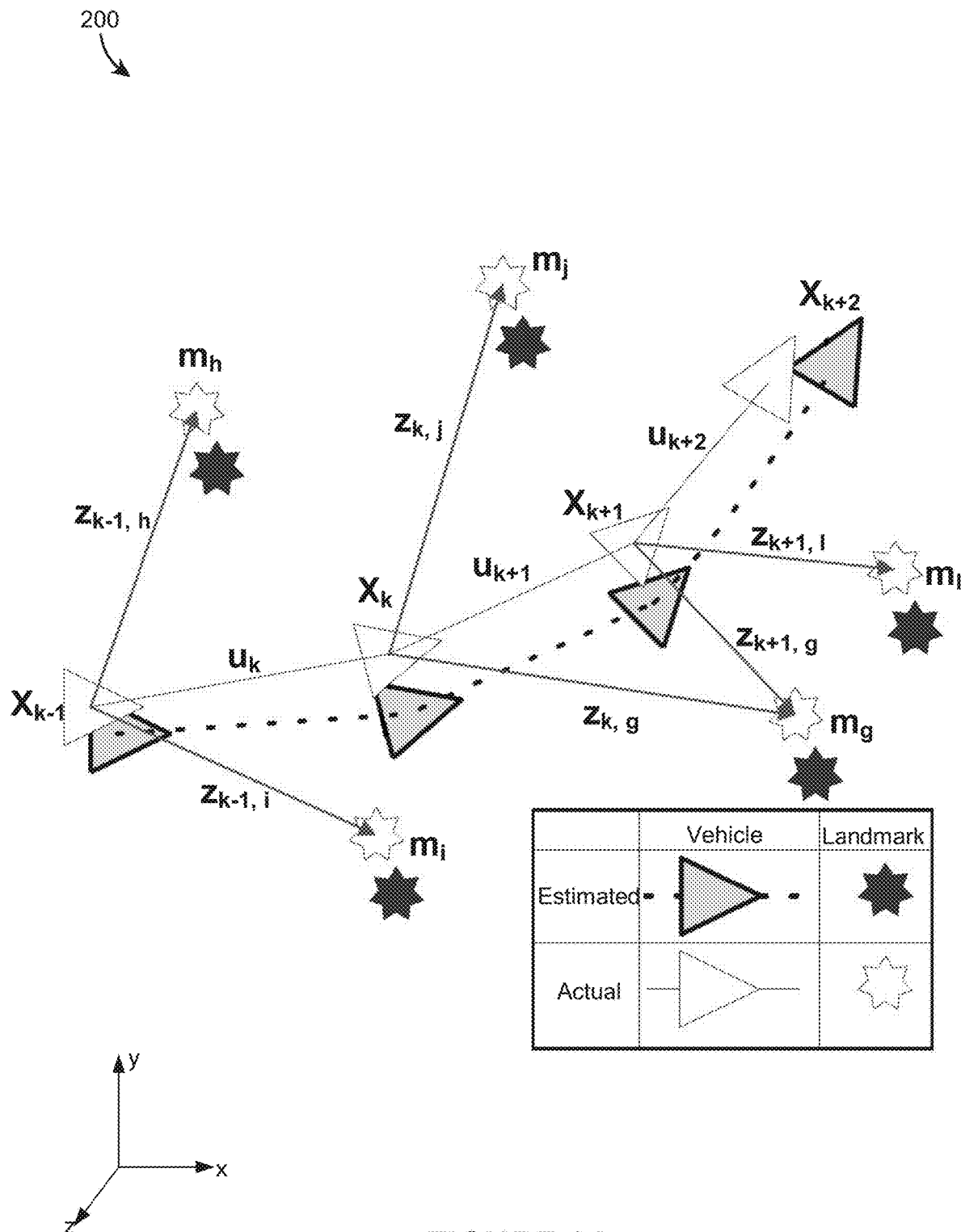
FIG. 2A illustrates an implementation of the computing system shown in accordance with FIGS. 1A-1B, in accordance with an example embodiment of the present disclosure. In particular.

For example, the IMU data 130 and the GPS data 131 may have been obtained or captured at same times, and may be fused with the point cloud frames 132 and 133 to obtain an estimate of a position and attitude (e.g., orientation) of the vehicle 101, as well as a covariance matrix indicating a confidence level or accuracy of each estimation. The estimated position and attitude may be superimposed, longitudinally and latitudinally, onto a map. Using the fused IMU data 130 and the GPS data 131, together with the point cloud frames 132 and 133, the computing system 121 may construct nodes on a pose graph, each of the nodes indicating data of the vehicle 101, such as, a position and attitude of the vehicle 101, at different times. As illustrated in FIG. 2A, a pose graph 200 may include nodes as represented by $X_{k-1}$; $X_k$; $X_{k+1}$; and $X_{k+2}$. Landmark locations may be represented by $m_h$; $m_i$; $m_j$; $m_g$; and $m_l$. The nodes $X_{k-1}$; $X_k$; $X_{k+1}$; and $X_{k+2}$, may indicate state vectors describing positions and attitudes of the vehicle 101 at times k−1, k, k+1, and k+2, respectively. The landmarks may be captured from Lidar point clouds such as the point cloud frames 132 and/or 133, and locations of the landmarks may be used to derive positions and attitudes of the Lidar point clouds. $u_k$; $u_{k+1}$; and $u_{k+2}$ may indicate controls and/or odometry readings of the vehicle 101 as the vehicle 101 travels between two nodes. $u_k$ is between the two nodes $X_{k-1}$ and $X_k$, $u_{k+1}$ is between the two nodes $X_k$ and $X_{k+1}$, and $u_{k+2}$ is between the two nodes $X_{k+1}$ and $X_{k+2}$. Meanwhile, $z_{k-1,i}$; $z_{k-1,h}$; $z_{k,j}$; $z_{k+1,g}$; and $z_{k+1,1}$ represent observations taken of distinct times and landmarks. For instance, $z_{k-1,i}$ indicates an observation taken at a time k−1 of the landmark $m_i$. As the vehicle 101 travels along a trajectory, the computing system 121 may construct additional nodes at distinct times and associates the additional nodes with captured sensor data such as point cloud frames. The nodes may be synchronized or correlated in time with captured point cloud frames, so that at each of the nodes, corresponding point cloud frames captured at a time corresponding to a time of the nodes are associated. Because a distance between a position of the vehicle 101 and an associated Lidar point cloud is known, a position and an attitude of the associated Lidar point cloud can be determined from the known position and the attitude of the vehicle 101. If multiple point clouds were captured at a same time, the computing system 121 may perform a point cloud registration to combine these point clouds. The point cloud registration process may include a rotation and a translation to align one point cloud, a target point cloud, to another point cloud, a source point cloud. Meanwhile, additional constraints are introduced into the pose graph, the constraints defining restrictions of each of the nodes, between two nodes, and between nodes and landmarks, to continuously update estimations of positions and attitudes of the vehicle 101, so that initial estimations of positions and attitudes of the vehicle 101 and positions of the landmarks may be updated and eventually converge near actual positions and attitudes of the vehicle 101 and actual positions of the landmarks. The constraints increase a level of robustness of the pose graph.

Figure 2B:
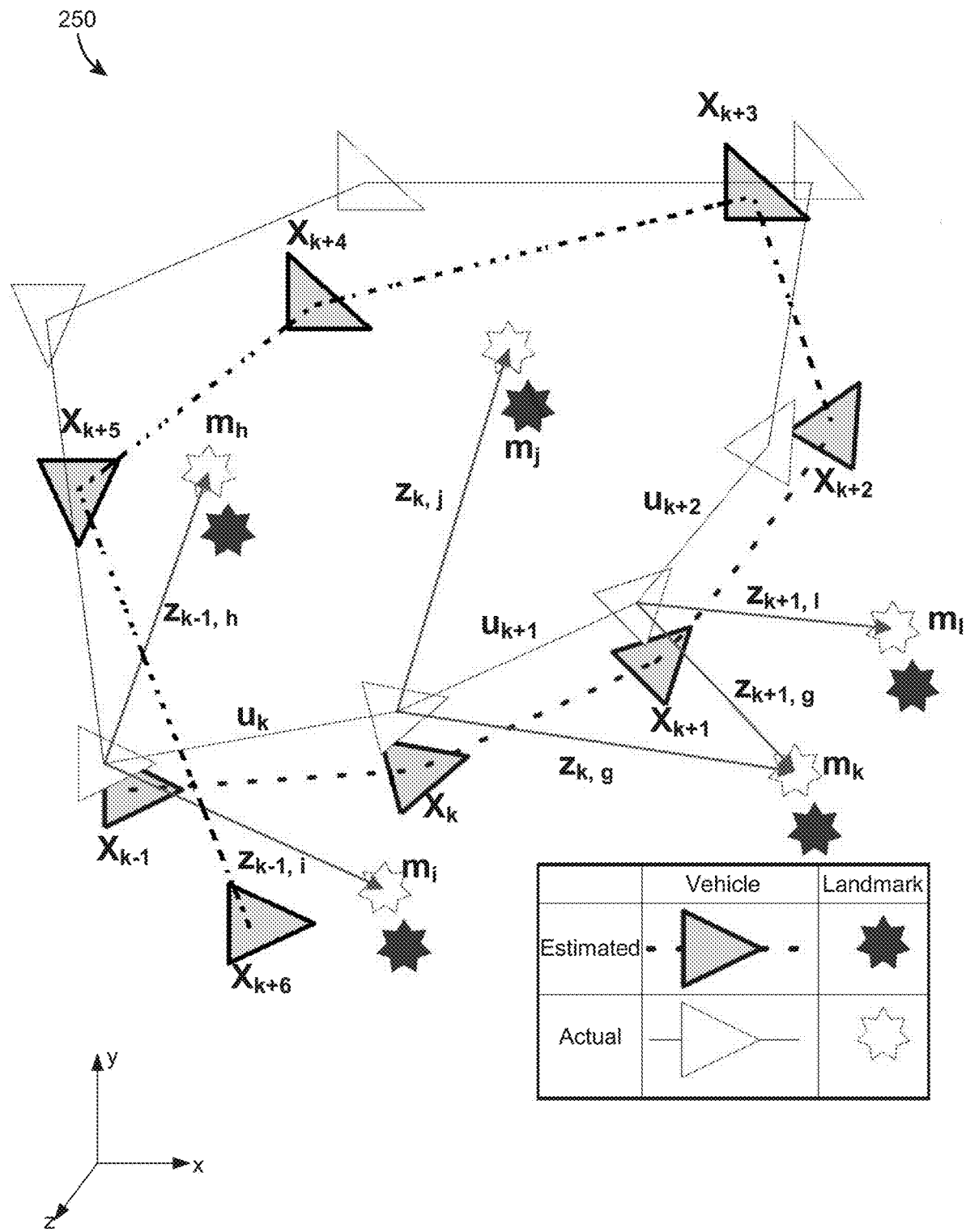
FIG. 2B illustrates an implementation of the computing system shown in accordance with FIGS. 1A-1B and 2A, in accordance with an example embodiment of the present disclosure. In particular.

Furthermore, the computing system 121 may perform an initial determination of potential loop closures based on proximities between positions at two different times, or proximities between different positions having time proximities, in order to further update the estimated positions and attitudes of the vehicle 101. In other words, based on the fused IMU data 130 and the GPS data 131, the computing system 121 may infer or estimate that the vehicle 101 is returning to a location within a threshold distance of a previously traversed, and having an attitude similar to that when the vehicle 101 previously traversed the location. The location and attitude may be defined by x and y planar coordinates while disregarding z (elevational) coordinates. Thus, if the vehicle 101 is estimated to be returning to a same location as a location that the vehicle 101 previously accessed, but at an opposite orientation, the computing system 121 may not detect a potential loop closure, because a loop closure condition may require that the vehicle returns to a previous location at a same or similar orientation as the previous orientation, such that the orientations do not differ by more than a threshold. An exemplary illustration of a loop closure is shown in a pose graph 250 illustrated in FIG. 2B, in which additional nodes $X_{k+3}$; $X_{k+4}$; $X_{k+5}$; and $X_{k+6}$ have been included. The computing system 121 may infer or estimate that at the node $X_{k+6}$, corresponding to a time k+6, a position and an attitude of the vehicle 101 are within thresholds of the position and the attitude of the vehicle 101 at the node $X_{k-1}$ corresponding to the time k−1. The computing system 121 may validate or confirm that the nodes $X_{k+6}$ and $X_{k-1}$ do indeed correspond to loop closures, for example, by determining whether common features exist at the point clouds captured at the nodes $X_{k+6}$ and $X_{k-1}$. One exemplary method involves converting and representing point clouds captured at the nodes $X_{k+6}$ and $X_{k-1}$ into a vector using, for example, a deconvolution network, encoding and decoding steps, and applying a model such as a bag-of-words model to recognize any common features. The detection of loop closures increases an accuracy of the pose graph by reducing a drift error that would otherwise occur over time, and incorporating an additional constraint corresponding to the loop closure. Thus, an estimated position and the attitude represented by the node $X_{k+6}$ may be updated, along with positions and attitudes represented by previous nodes. An estimated position and attitude of the point clouds associated with each of the nodes may also be updated.

The computing system 121 may generate a solution including positions and attitudes at which different measurements were taken, as indicated, for example, by the nodes $X_{k-1}$ to $X_{k+6}$ and/or positions and attitudes of landmarks as indicated, for example, by the landmarks $m_i$ through $m_j$. As will be described further in reference to FIGS. 3A-3B and 4-8, the computing system 121 may enrich and elucidate the solution by presenting, on an interface, additional contextual data of the solution that, for example, facilitates a user's ability to view how changes to certain constraints may impact the solution. In some embodiments, interfaces shown separately in FIGS. 3A-3B and 4-8 for ease of illustration may be combined on a common interface. For example, the features shown in FIGS. 7 and 8 may be combined or integrated in a common interface. After receiving, for example, from a user, an input of a selection of one of the nodes, or a portion of the solution, the computing system 121 may present, on an interface, point cloud frames such as files and parameters related to the point clouds, in order to provide additional context and visualization of the selected input or the selected portion of the solution. In some embodiments, the computing system 121 may present the parameters in a form of a map as trajectory points, similar to the nodes $X_{k-1}$ to $X_{k+6}$. The computing system 121 may further present the parameters according to four different settings: 1) prior to SLAM; 2) following GNSS-IMU post-processing; 3) following point cloud registration and optimization of constraints; and 4) following further optimization or customization. The trajectory points may be connected by lines indicating temporal relationships between the trajectory points, and additional lines indicating relationships between point cloud registration constraints, for example, loop closure constraints.

The computing system 121 may receive, for example, from a user, a selection of a trajectory point. If a trajectory point is selected, the computing system 121 may display data of the trajectory point, constraints followed and/or satisfied by the trajectory point, and one or more point clouds related to the trajectory point, such as, a point cloud captured at a time, position, and attitude corresponding to the trajectory point. The computing system 121 may further display pairs of trajectory points that a constraint pertains to. For example, a loop closure constraint may pertain to a first trajectory point that the vehicle 101 initially traversed while facing a particular orientation, attitude, or pose, and a second trajectory point having a same or similar location and/or attitude as the first trajectory point, in which the vehicle returned to an original location that was traversed previously. The computing system 121 may then display the two aforementioned trajectory points that pertain to this loop closure constraint.

The computing system 121 may receive, for example, from a user, a selection of a constraint or a pair of constraints, as indicated by a line or other connection between the trajectory points pertinent, or affected by, the constraint or pair of constraints. The computing system 121 may, upon receiving a selection of a constraint or a pair of constraints, display data of the constraint. The computing system 121 may further display relative positions and attitudes of the trajectory points in an event that the constraint or pair of constraints were fully satisfied. In some embodiments, a solution generated using SLAM may not fully satisfy all constraints, but rather, attempts to minimize errors in some of the constraints. Through removing of outliers, the errors may be distributed among some or all of the constraints. Thus, the computing system 121 may illustrate changes in relative positions and attitudes of the trajectory points if a constraint that was not fully satisfied under the solution is now fully satisfied. In such a manner, a user may be able to determine whether certain constraints take precedence over other constraints, and if a better and/or more accurate solution is arrived at by fully satisfying a constraint. In some embodiments, the computing system 121 may display relative positions and attitudes of the trajectory points assuming that the selected constraint is fully satisfied, while disregarding one or more other constraints. The computing system 121 may further display the point clouds to which the constraint pertains. The computing system 121 may then display the corresponding point clouds under the solution, in which the selected constraint, and/or other constraints, may not be fully satisfied.

In some embodiments, the computing system 121 may receive, for example, from a user, an input to delete a constraint or pair of constraints or to adjust a weight of a constraint or pair of constraints. The computing system 121 may compute an updated solution and display updated data of the trajectory points and/or point clouds using the deleted constraint or the adjusted constraint. Therefore, the computing system 121 facilitates a user being able to view an impact of deleting or modifying a weight of a constraint on the data of the trajectory points and the point clouds, thus providing a numerical and visual representation of a SLAM solution.

Figure 3A:
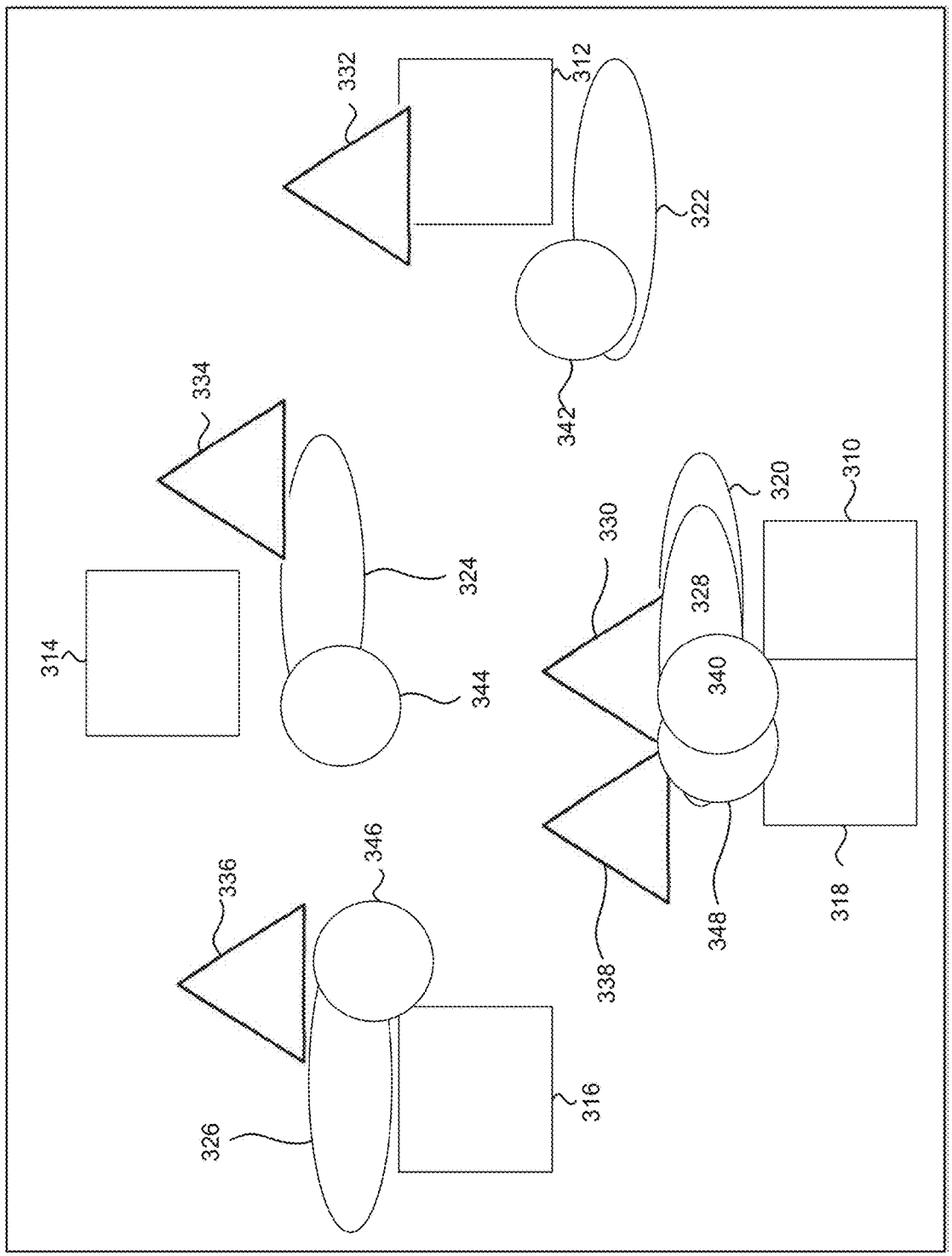
FIGS. 3A-3B and 4-8 illustrate implementations of the computing system providing contextual data of a mapping algorithm, in accordance with FIGS. 1A-1B and 2A-2B.

FIG. 3A illustrates an implementation in which the computing system 121 generates a display of trajectory points under different settings, which may indicate locations and/or attitudes of the vehicle 101 while the vehicle is capturing point cloud frames such as the point cloud frames 132 and 133. Each trajectory point may correspond to a location and/or attitude of the vehicle 101 when a point cloud frame was captured. In particular, the trajectory points 310, 312, 314, 316, and 318 may indicate estimated positions of the vehicle 101 from raw sensor data, such as, from the point cloud frames themselves. The trajectory points 320, 322, 324, 326, and 328 may indicate estimated positions of the vehicle 101 from the point cloud frames fused with GNSS data and IMU data such as the GNSS data 131 and the IMU data 130. Thus, the trajectory points 320, 322, 324, 326, and 328 may include further constraints resulting from the fusion or synchronization of the GNSS data 131 and the IMU data 130. The trajectory points 330, 332, 334, 336, and 338 may indicate estimated positions of the vehicle 101 from the point cloud frames fused with the GNSS data 131, the IMU data 130, and following point cloud registration and optimization of a SLAM solution. The trajectory points 340, 342, 344, 346, and 348 may indicate estimated positions of the vehicle 101 from the point cloud frames, as further customized and optimized from the trajectory points 330, 332, 334, 336, and 338. The trajectory points 310, 320, 330, and 340 may all correspond to the same point, and represent estimates of locations of the vehicle 101, as obtained and refined using additional data. Likewise, the trajectory points 312, 322, 332, and 342 may all correspond to the same point. The trajectory points 314, 324, 334, and 344 may all correspond to the same point. The trajectory points 316, 326, 336, and 346 may all correspond to the same point. The trajectory points 318, 328, 338, and 348 may all correspond to the same point. The point cloud registration and optimization process will be described briefly below.

In some embodiments, the point cloud registration may be initiated by a preliminary estimation or inference of loop closures. For these loop closures that are inferred or estimated, the computing system 121 may attempt to perform a point cloud registration on point clouds captured at times corresponding to the inferred or estimated loop closures. The computing system 121 may infer or estimate additional loop closures, for example, from common features identified in overlapping registered point clouds. For example, if two point clouds from different times have been successfully registered, the computing system 121 may infer that a potential loop closure has occurred corresponding to these two different times because similar or same features were observed from the two point clouds. The computing system 121 may then validate or confirm that a loop closure has occurred. If the loop closure has been confirmed or validated, the computing system 121 may then add a loop closure constraint between two trajectory points corresponding to the different times. For example, the computing system 121 may require that the vehicle 101 be at or near a same location, within a threshold distance, at the times associated with the loop closures. The computing system 121 may further incorporate constraints into each of the trajectory points and between the trajectory points that account for the fused GNSS data 131 and the IMU data 130. As another example, other constraints from the fused GNSS data 131 and the IMU data 130 may require that the vehicle 101 be spaced apart at a given distance, within a threshold range of distances, between two distinct times. For example, an odometry constraint may require that the vehicle 101 be spaced apart by 500 meters at time 0 seconds and at time 5 seconds. The computing system 121 may further augment map data from the registered point clouds by stitching together partially overlapping point clouds.

The point cloud registration process includes an iterative process that is repeated until convergence. For each point from a source point cloud, obtained at an earlier time, a corresponding closest point in a target point cloud, obtained at a later time, may be selected using a GPU. The point from the source point cloud and the closest point are required to have a same category, or else, that pair is discarded and another point from the source point cloud and a closest point in the target point cloud are selected. For a point from the source point cloud and a corresponding closest point in the target point cloud having matching categories, a mahalanobis distance may be determined between the two points based on the surface normal of the source point cloud. Cost functions may be determined based on the determined mahalanobis distance and based on the determined or estimated range accuracy of the point from the source point cloud and/or the target point cloud. A solution to minimize the cost functions may be obtained by adjusting position and attitude parameters of the source point cloud relative to an origin. In some examples, the origin may be a rear-axis of the vehicle, and an attitude is defined to be a same as an attitude of the vehicle. The origin and the axes, however, can be defined in other manners, such as an origin of the Lidar sensor, or an origin of a navigation-box of the vehicle. Defining different origins will yield different coordinates of the source point cloud. The iterative process converges when an amount of adjustment or change in the position and the attitude parameters between successive iterations differs by less than a threshold.

For each of the loop closure, odometry, and other constraints, a corresponding cost function may be determined. Parameters associated with a position and an attitude of associated point clouds such that the cost function is optimized and convergent may be determined. When a cost function is optimized, the corresponding constraint may be satisfied. Next, further refinement to the parameters may be carried out. For example, if a constraint cannot be satisfied or minimized, such a constraint may be removed based on a self-adaption threshold of an actual cost, iterations of repetition, and differences in Euclidean distance. Furthermore, loop closure constraints may be added in regions of which a degree of self-repetition (a frequency or number of repeated features) is greater than a threshold, while avoiding points that have been previously removed. In particular, a previous process of tightening the parameters in self-repetitive regions may cause points to become detached from the pose graph and misalignment among points. For those detached or misaligned points, the computing system 121 may attempt to add constraints. The constraints may be from loop closure or from other sources such as GNSS-IMU post processing. The parameters may be further refined based on the newly removed and added constraints. Constraints may continue to be removed until a number of constraints that cannot be minimized is smaller than a threshold, at which point the process is considered to converge. In such a manner, position and attitude information of the vehicle 101, and thus of the point cloud frames, may be obtained. The point clouds may then be aligned with one another through rigid body transformations and stitched together.

Figure 3B:
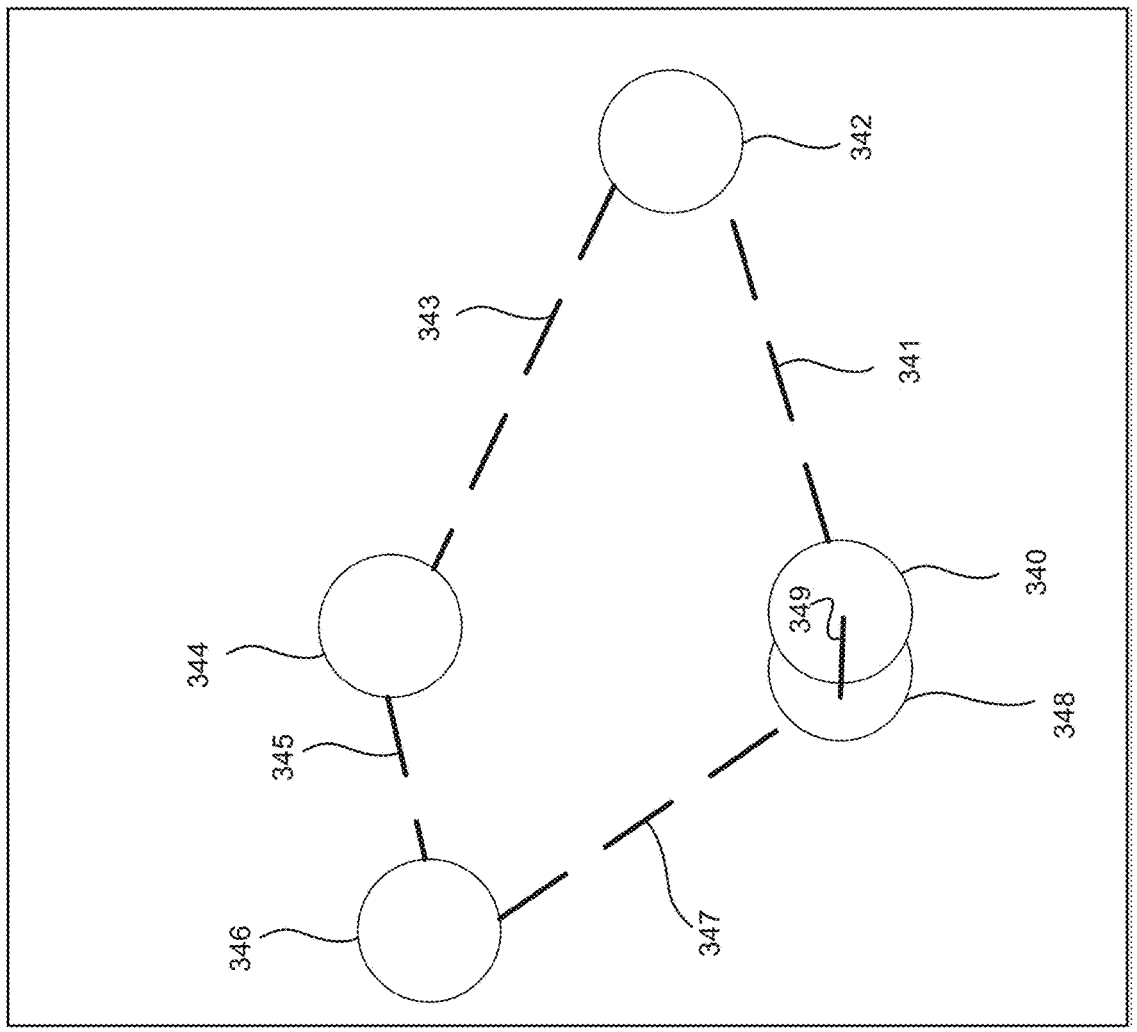

FIG. 3B illustrates an implementation in which the computing system 121 generates a display of trajectory points 340, 342, 344, 346, and 348 connected via lines 341, 343, 345, 347, and 349 indicating time relationships and/or constraints, such as loop closure constraints, between the trajectory points. For example, the line 349 may indicate a loop closure constraint between the trajectory points 340 and 348. The time relationships may indicate that each trajectory point should be within a certain distance to another trajectory point based on a velocity of the vehicle 101. For example, if trajectory points 340 and 342 represent captures of two separate point cloud frames one second apart, and the vehicle 101 is travelling at a constant or average speed of 180 kilometers per hour, then the trajectory points 340 and 342 should be around 50 meters apart. Although the implementation is shown with the trajectory points 340, 342, 344, 346, and 348, for ease of illustration, other implementations may be shown with other or additional sets of trajectory points, such as the trajectory points 310, 312, 314, 316, and 318 representing raw point cloud frames.

Figure 4:
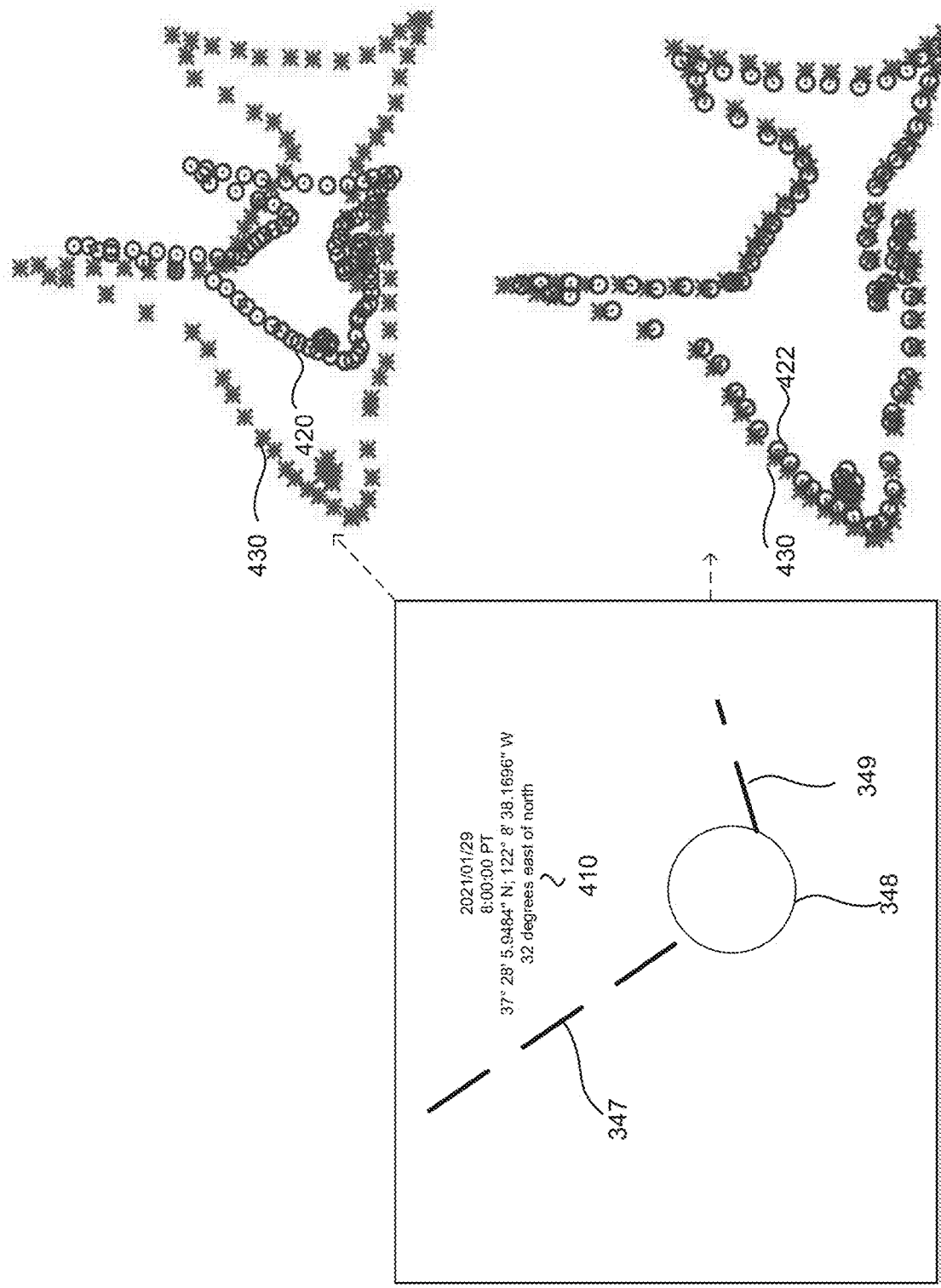

FIG. 4 illustrates an implementation in which the computing system 121 receives a selection of one or more trajectory points, such as the trajectory point 348. The computing system 121 may display information of this trajectory point 348, an estimated timestamp, position, and/or attitude 410 of the trajectory point 348, any constraints that the trajectory point 348 is linked to, and one or more point clouds related to the trajectory point 348. The point clouds may be viewed from different 3-dimensional perspectives by adjusting position and angle. For example, the computing system 121 may display that the trajectory point 348 is constrained by the constraints 347 and 349. The computing system 121 may further display one or more point clouds related or connected to the trajectory point 348. In particular, the point trajectory point may be connected to a point cloud frame 420 captured at a time corresponding to the trajectory point 348. The point cloud frame 420 may further have been registered, or aligned with a source point cloud frame 430 which corresponds to another trajectory point, such as the trajectory point 340. The point cloud frames 420 and 430 may have been identified to have common features but are aligned differently. Thus, the point cloud frame 420 may have been transformed to a point cloud frame 422, which is projected by the loop closure constraint 349. Thus, the computing system 121 may display the original captured point cloud and the transformed point cloud projected by a loop closure constraint, and another source point cloud used as a reference to transform the original captured point cloud.

Figure 5:
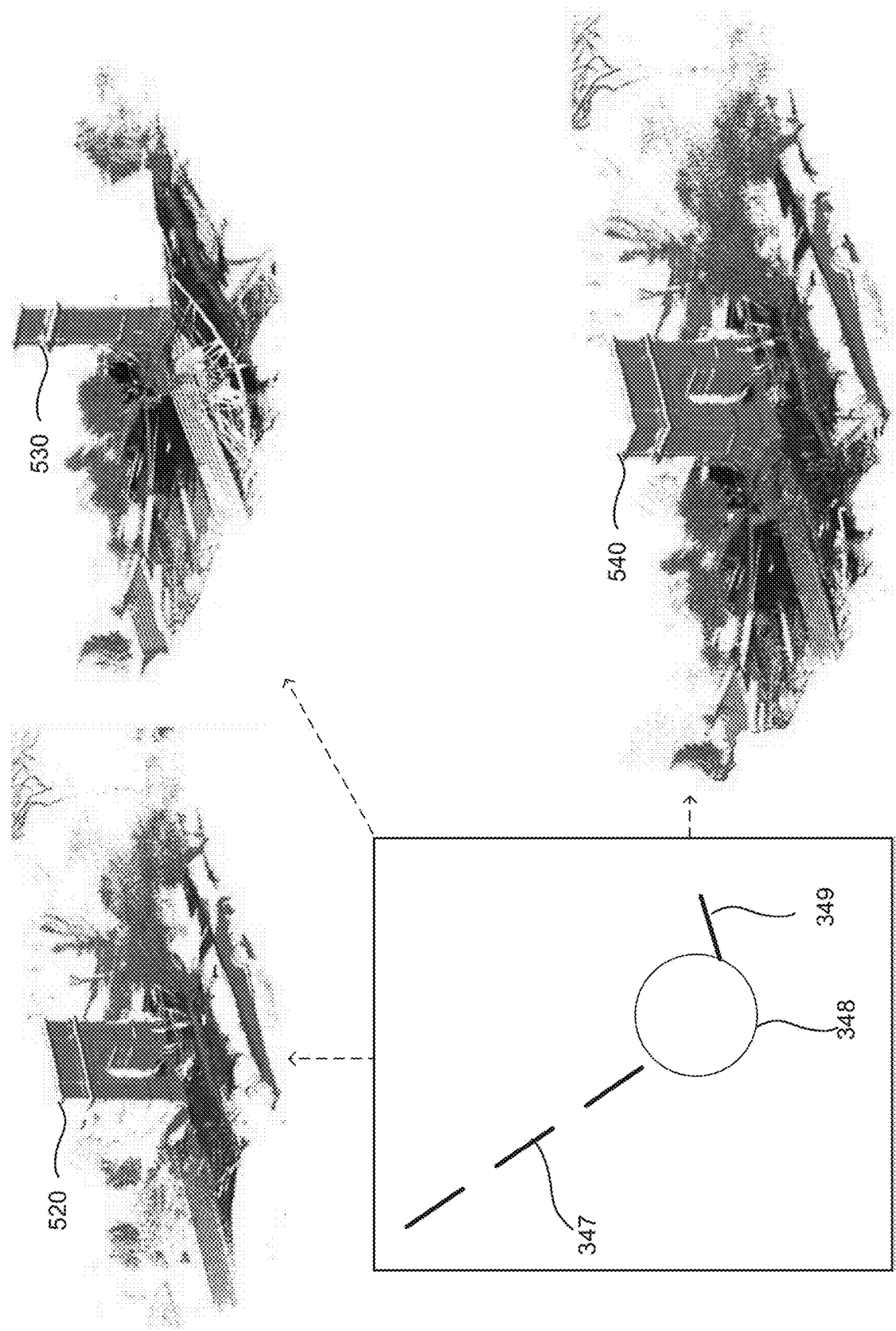
Figure 6:
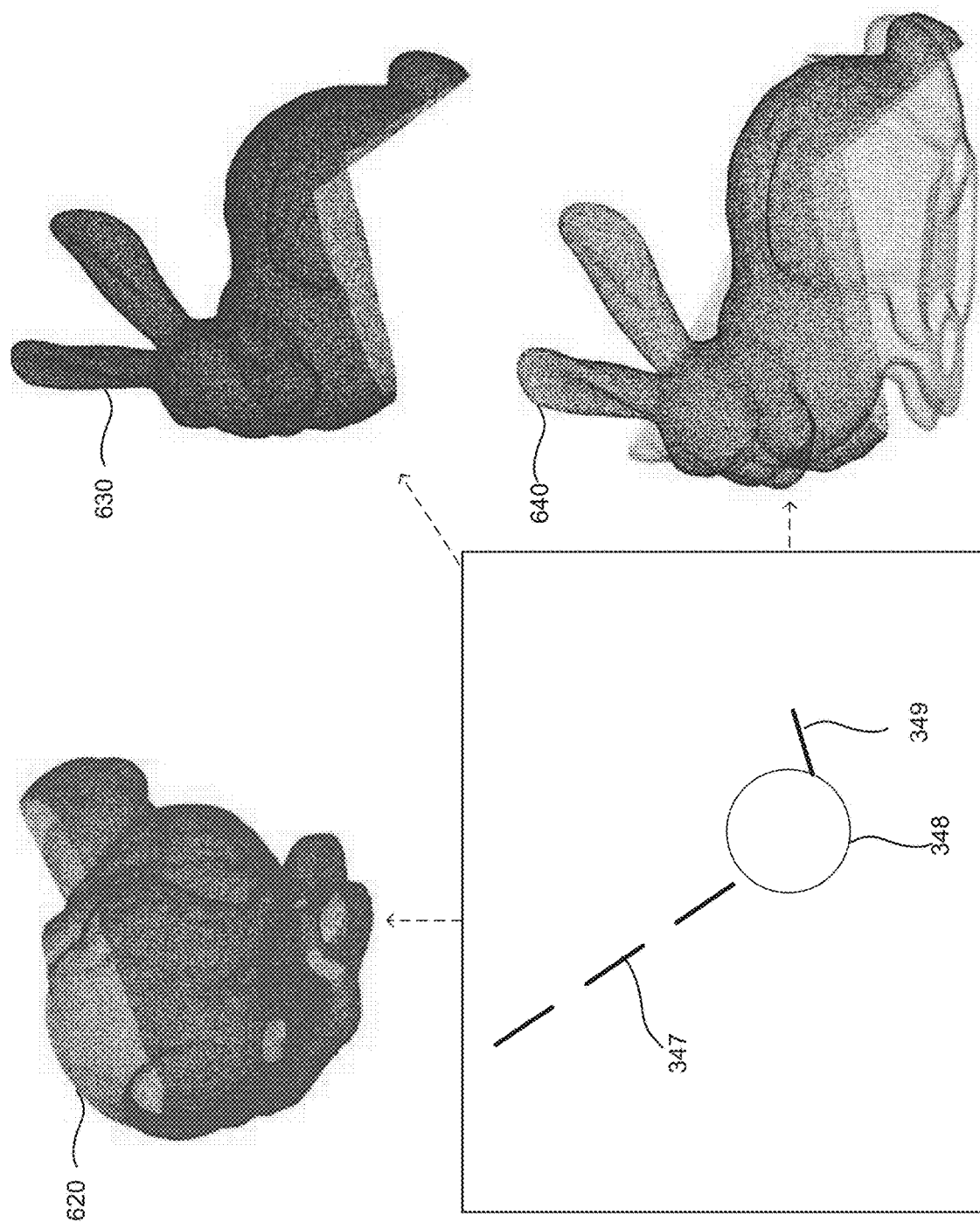

Similar to FIG. 4, FIGS. 5 and 6 illustrate implementations in which the computing system 121 receives a selection of one or more trajectory points, such as the trajectory point 348, and displays point clouds related to the trajectory point 348. In FIG. 5, a point cloud frame 520 originally captured at a time corresponding to the trajectory point 348 may be merged with a second point cloud frame 530 in order to combine features illustrated in each of the point cloud frames 520 and 530, and create a merged point cloud 540, which is projected by the loop closure constraint 349. The computing system 121 may display information of the original point cloud, and any point cloud that the original point cloud was merged with to combine features, as well as a resulting point cloud from the merging.

In FIG. 6, the computing system 121 illustrates that a point cloud frame 620 originally captured at a time corresponding to the trajectory point 348 may be aligned with and merged with a second point cloud frame 630 in order to combine features illustrated in each of the point cloud frames 620 and 630, and create a merged point cloud 640 projected by the loop closure constraint 349, in which some features overlap between the point cloud frames 620 and 630, while other features in the merged point cloud 640 may only belong to one of the point cloud frames 620 or 630. The computing system 121 may display information of the original point cloud, and any point cloud that the original point cloud was aligned and merged with to combine features, as well as a resulting point cloud from the alignment and merging.

Figure 7:
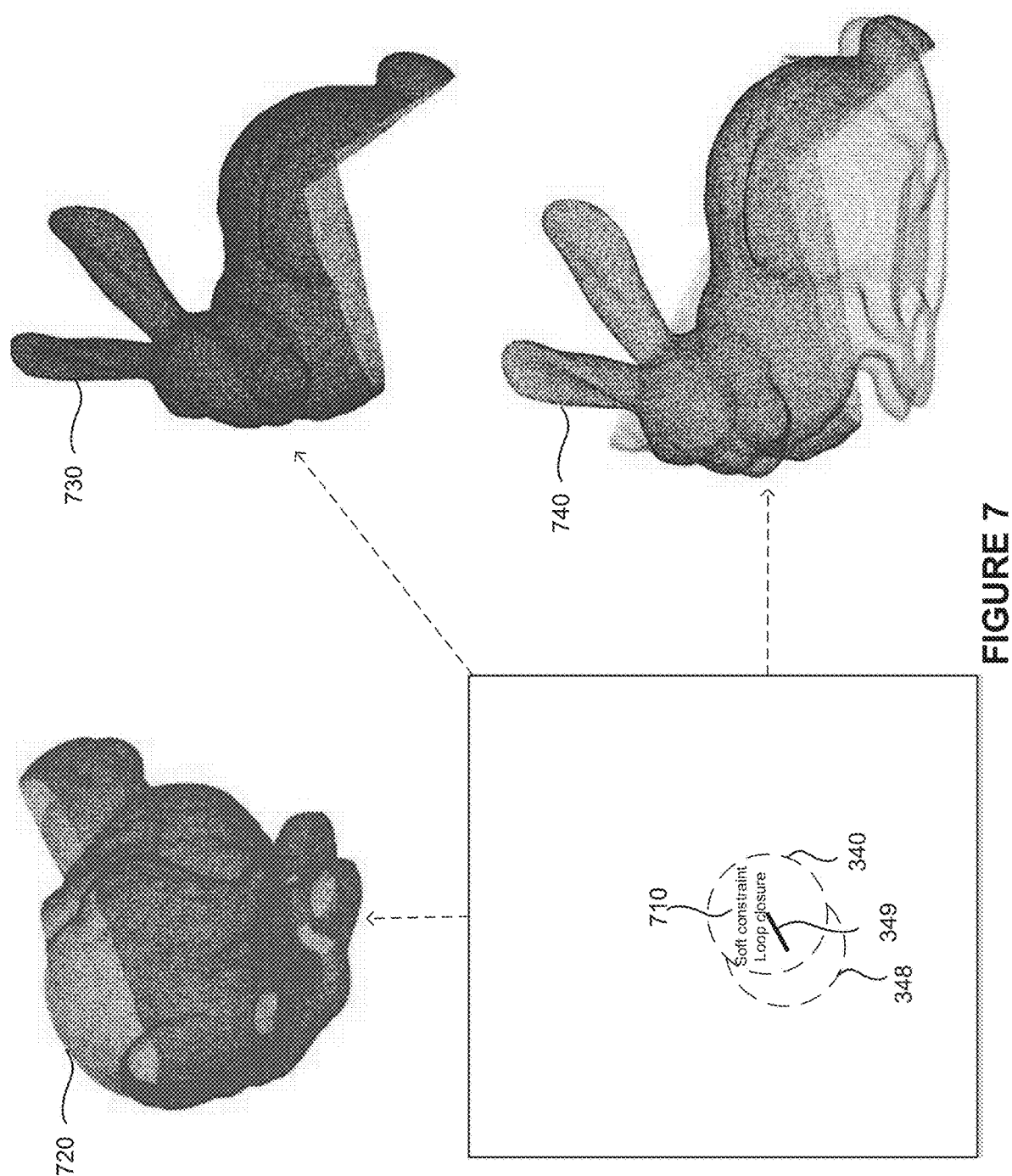
Figure 8:
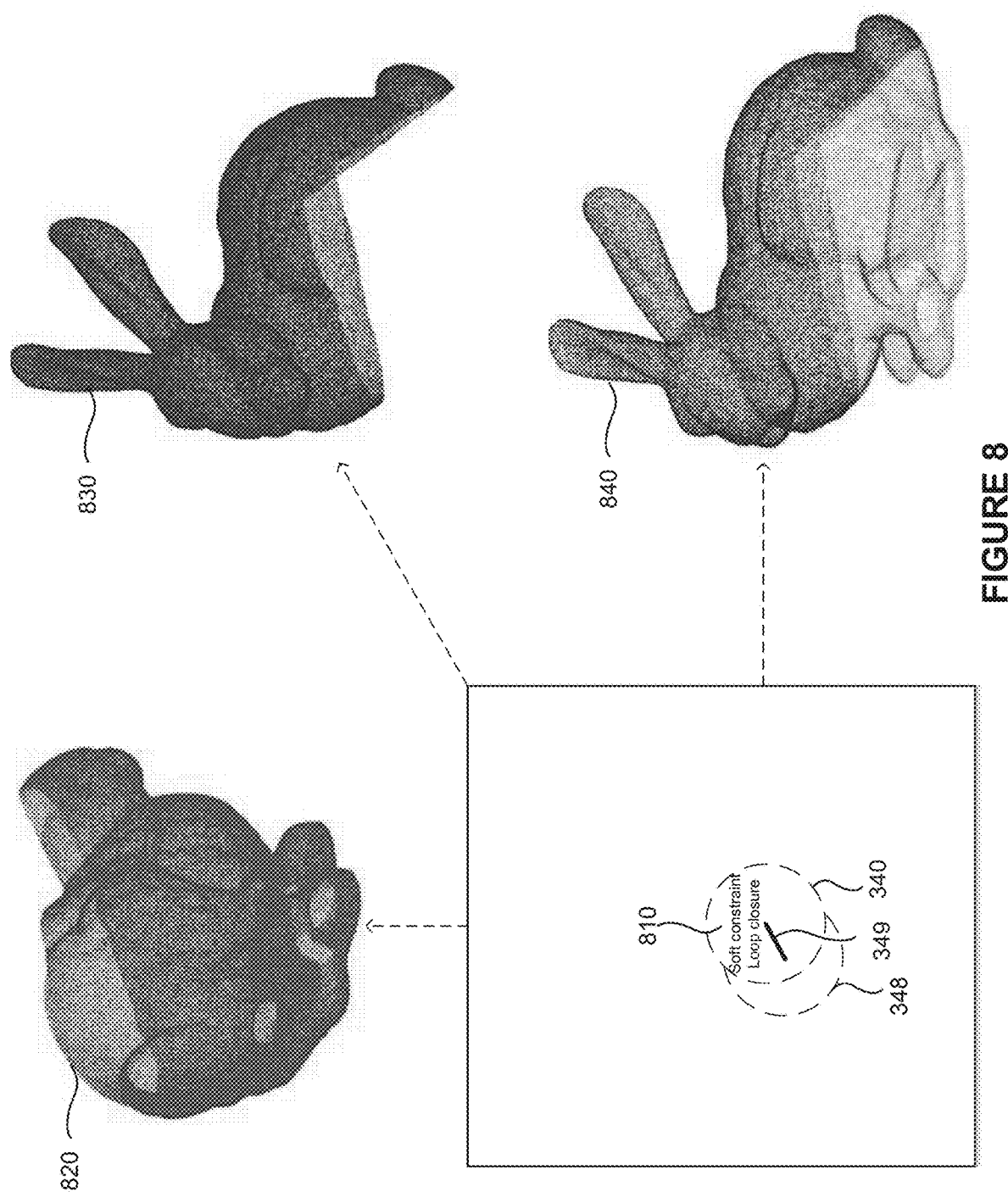

In some embodiments, the computing system 121 may receive a selection of a constraint. As illustrated in FIGS. 7 and 8, the computing system 121 may receive a selection of the constraint 349. The computing system 121 may display the trajectory points affected by the constraint 349, including the trajectory points 340 and 348. The computing system 121 may display further information 710 of the constraint 349, including whether it was fully satisfied or whether it is a soft constraint or a hard constraint. Additionally, the computing system 121 may display information regarding a type of constraint that the constraint 349 falls under, such as, for example, a loop closure constraint or a GNSS-IMU constraint. The computing system 121 may further display effects of the trajectory points 340 and 348 if the constraint 349 were fully satisfied. For example, the computing system 121 may display that the trajectory points 340 and 348 overlap completely or nearly completely if the constraint 348 were fully satisfied. Additionally, the computing system 121 may display point cloud frames associated with the trajectory points 340 and 348, which were affected by the constraint 349. For example, in FIG. 7, the computing system 121 displays a point cloud frame 720 corresponding to the trajectory point 348 and a second point cloud frame 730 corresponding to the trajectory point 340. The computing system 121 may further display a resulting point cloud frame 740, which is projected by the loop closure constraint 349, from an alignment of the point cloud frame 720 to the second point cloud frame 730 and/or merging of the point cloud frame 720 and the second point cloud frame 730. In FIG. 7, the constraint 349 may not be fully satisfied, but other constraints besides the constraint 349 may be accounted in determining the transformation to align and merge the point cloud frame 720 to the second point cloud frame 730.

Meanwhile, in FIG. 8, the computing system 121 displays information 810 of the constraint 349, which may be same or similar data as the information 710 in FIG. 7. In FIG. 8, the computing system 121 may further display a point cloud frame 820 corresponding to the trajectory point 348 and a second point cloud frame 830 corresponding to the trajectory point 340. The point cloud frame 820 may be similar or same as the point cloud frame 720 and the point cloud frame 830 may be similar or same as the point cloud frame 730. However, a difference in FIG. 8 is that the computing system 121 may determine a resulting point cloud frame 840 under a condition that the constraint 349 is to be fully satisfied. As illustrated in FIG. 8, the resulting point cloud frame 840 may exhibit different or improved alignment or merging compared to the resulting point cloud frame 740 in FIG. 7, due to the constraint 349 being fully satisfied in FIG. 8.

In some embodiments, in FIG. 8, the computing system 121 may operate under an assumption that one or more other constraints may be at least partially disregarded, for example, ignored, downweighted, or loosened, and/or an effect of fully satisfying the constraint 349 on other constraints may be disregarded. In other embodiments, the computing system 121 may further determine an effect on one or more other constraints such as the constraint 341, as a result of fully satisfying the constraint 349, and display other point clouds, or changes in other point clouds, resulting from an effect on one or more other constraints. For example, other point cloud frames that are registered may not be aligned as closely due to possibly loosening one or more constraints such as the constraint 341 as a result of full satisfying the constraint 349. In some embodiments, the computing system 121 may receive an input to delete one or more constraints and/or adjust a weight of one or more constraints. The computing system 121 may generate a new optimized solution given the deleted or adjusted constraints. The computing system 121 may also generate or regenerate a map, or transform an existing map, based on the deleted one or more constraints and/or adjusted weight of the one or more constraints. In some embodiments, the computing system 121 may display at least a portion of an existing map and a corresponding portion of a regenerated or transformed map on a same interface or on different interfaces. In some embodiments, the computing system 121 may display updated point cloud frames as a result of deleting or adjusting a weight of the one or more constraints.

FIG. 9 illustrates a flowchart of a method of updating an existing map, according to an example embodiment of the present disclosure. The description from other figures may also be applicable to FIG. 9. Any or all of the steps may be implemented by a hardware processor of a vehicle or remote from the vehicle. In step 902, one or more hardware processors may obtain sensor data from a sensor of a vehicle, the sensor data including point cloud frames at different positions, orientations, and times, the sensor data used to generate a map. In step 904, one or more processors may determine a position and an orientation of the sensor corresponding to a capture of each of the point cloud frames according to a simultaneous localization and mapping (SLAM) algorithm. In step 906, one or more processors may depict, on an interface, a graphical illustration of the determined positions at which the point cloud frames were captured.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 10:
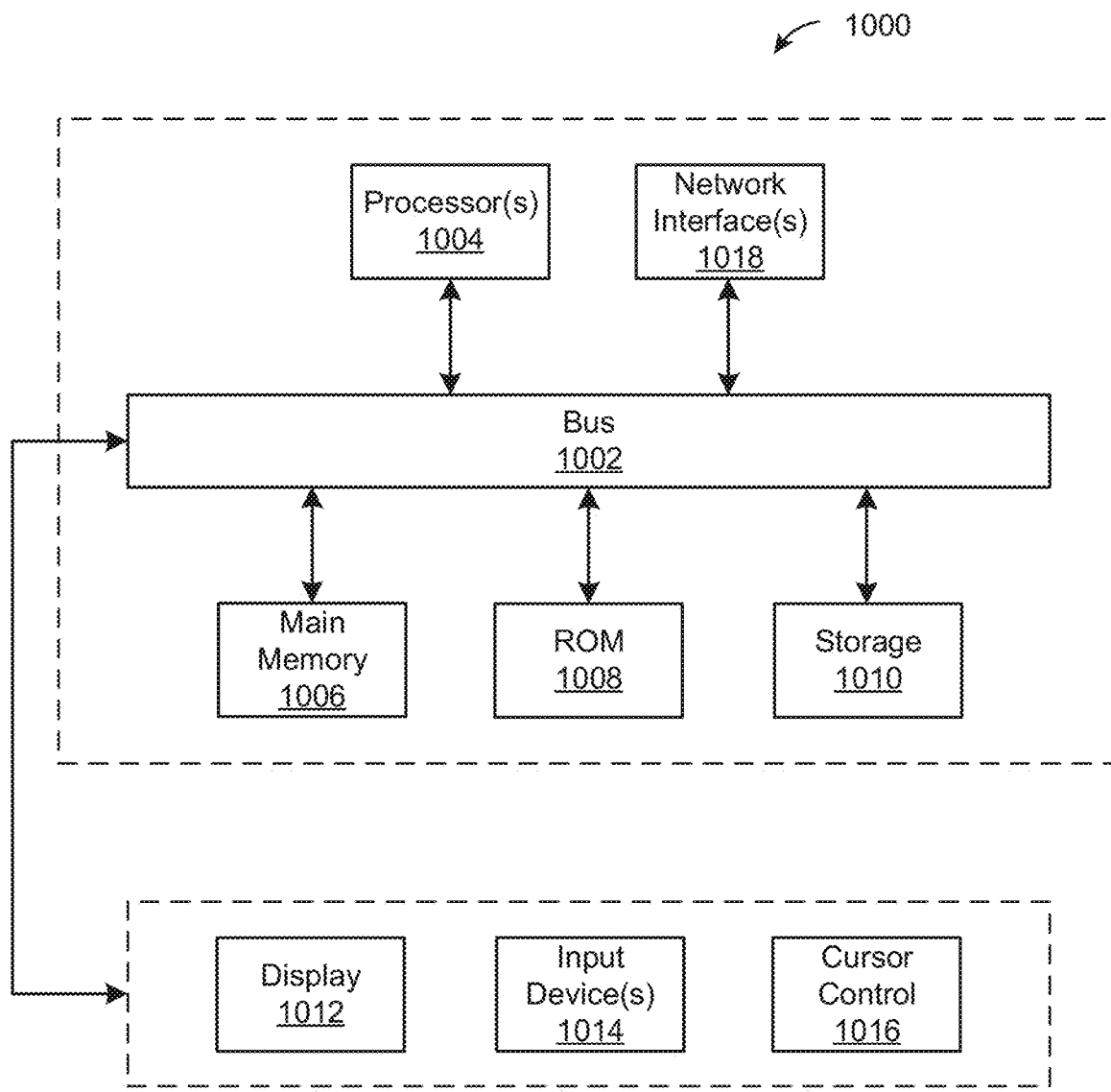
FIG. 10 illustrates a block diagram of a computer system upon which any of the embodiments described herein may be implemented.

FIG. 10 illustrates a block diagram of a computer system 1000 upon which any of the embodiments described herein may be implemented. The computer system 1000 includes a bus 1002 or other communication mechanism for communicating information, one or more hardware processors 1004 coupled with bus 1002 for processing information. A description that a device performs a task is intended to mean that one or more of the hardware processor(s) 1004 performs that task. The hardware processor(s) 1004 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor(s) 1004 may also combine custom hard-wired logic, ASICs, or FPGAs with custom programming to accomplish the techniques. The hardware processor(s) 1004 can include any suitable processing unit capable of accepting data as input, processing the input data in accordance with stored computer-executable instructions, and generating output data. The hardware processor(s) 1004 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 1004 can have any suitable microarchitecture design that includes any number of constituent components such as, for example, registers, multiplexers, arithmetic logic units, cache controllers for controlling read/write operations to cache memory, branch predictors, or the like. The microarchitecture design of the hardware processor(s) 1004 can be made capable of supporting any of a variety of instruction sets.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to output device(s) 1012, such as a cathode ray tube (CRT) or LCD display (or touch screen), for displaying information to a computer user. Input device(s) 1014, including alpha-numeric and other keys, are coupled to bus 1002 for communicating information and command selections to processor 1004. Another type of user input device is cursor control 1016. The computer system 1000 also includes a communication interface 1018 coupled to bus 1002.

The term "engine" or "program module" should be understood to encompass a tangible entity, be that an entity that is physically constructed, permanently configured (e.g., hard-wired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computing system comprising:
one or more processors; and
a memory storing instructions that, when executed by the one or more processors, cause the computing system to perform:
obtaining sensor data from a sensor of a vehicle, the sensor data including point cloud frames at different positions, orientations, and times, the sensor data used to generate a map;
determining a position and an orientation of the sensor corresponding to a capture of each of the point cloud frames according to a simultaneous localization and mapping (SLAM) algorithm; and
depicting, on an interface, a graphical illustration of the determined positions at which the point cloud frames were captured, wherein the graphical illustration includes trajectory points indicating the determined positions and connectors connecting the trajectory points to indicate loop closure constraints among the trajectory points;
receiving a selection of a loop closure constraint; and
in response to receiving the selection of the loop closure constraint, displaying data of the loop closure constraint, the data indicating second trajectory points subject to the loop closure constraint.

2. The computing system of claim 1, wherein the graphical illustration includes trajectory points indicating the determined positions and lines connecting the trajectory points to indicate time relationships or constraints between the trajectory points.

3. The computing system of claim 2, wherein the trajectory points are depicted at different stages of the SLAM algorithm, the stages including after capture of the sensor data, after GNSS-IMU post processing, and after point cloud registration.

4. The computing system of claim 2, wherein the instructions further cause the computing system to perform:
receiving a selection of a trajectory point of the trajectory points; and
displaying a point cloud frame corresponding to the trajectory point.

5. The computing system of claim 4, wherein the instructions further cause the computing system to perform:
displaying a second point cloud frame resulting from a registration of the point cloud frame according to a source point cloud.

6. The computing system of claim 2, wherein the instructions further cause the computing system to perform:
receiving a selection of a constraint; and
displaying data of the constraint, the data indicating second trajectory points subject to the constraint and whether the constraint is a soft constraint or a hard constraint.

7. The computing system of claim 6, wherein the instructions further cause the computing system to perform:
displaying information of the trajectory points connected by the constraint and associated with the constraint;
displaying point cloud frames corresponding to the trajectory points; and
displaying a resulting point cloud frame generated from a merging or an aligning operation of the point cloud frames corresponding to the trajectory points.

8. The computing system of claim 7, wherein the resulting point cloud frame is generated under a condition that the constraint is only partially satisfied; and the instructions further cause the one or more processors to perform:
displaying a second resulting point cloud frame generated from a merging or an aligning operation of the point cloud frames under a second condition that the constraint is fully satisfied.

9. The computing system of claim 2, wherein the instructions further cause computing system to perform:
receiving an indication to delete a constraint of the constraints;
redetermining the position and the orientation of the sensor corresponding to the capture of each of the point cloud frames according to the deleted constraint; and
depicting, on an interface, a graphical illustration of the redetermined positions at which the point cloud frames were captured.

10. The computing system of claim 9, wherein the instructions further cause the computing system to perform:
generating the map according to the sensor data and the determined position and orientation of the sensor; and
transforming the map according to the redetermined position and the orientation of the sensor and the removal of the constraint.

11. The computing system of claim 2, wherein at least a portion of the constraints correspond to a fusion of GNSS data and IMU data.

12. A computer-implemented method, comprising:
- obtaining sensor data from a sensor of a vehicle, the sensor data including point cloud frames at different positions, orientations, and times, the sensor data used to generate a map;
- determining a position and an orientation of the sensor corresponding to a capture of each of the point cloud frames according to a simultaneous localization and mapping (SLAM) algorithm; and
- depicting, on an interface, a graphical illustration of the determined positions at which the point cloud frames were captured, wherein the graphical illustration includes trajectory points indicating the determined positions and connectors connecting the trajectory points to indicate loop closure constraints among the trajectory points;
- receiving a selection of a loop closure constraint; and
- in response to receiving the selection of the loop closure constraint, displaying data of the loop closure constraint, the data indicating second trajectory points subject to the loop closure constraint.

13. The computer-implemented method of claim 12, wherein the graphical illustration includes trajectory points indicating the determined positions and lines connecting the trajectory points to indicate time relationships or constraints between the trajectory points.

14. The computer-implemented method of claim 13, wherein the trajectory points are depicted at different stages of the SLAM algorithm, the stages including after capture of the sensor data, after GNSS-IMU post processing, and after point cloud registration.

15. The computer-implemented method of claim 13, further comprising:
- receiving a selection of a trajectory point of the trajectory points; and
- displaying a point cloud frame corresponding to the trajectory point.

16. The computer-implemented method of claim 15, further comprising:
- displaying a second point cloud frame resulting from a registration of the point cloud frame according to a source point cloud.

17. The computer-implemented method of claim 13, further comprising:
- receiving a selection of a constraint; and
- displaying data of the constraint, the data indicating second trajectory points subject to the constraint and whether the constraint is a soft constraint or a hard constraint.

18. The computer-implemented method of claim 17, further comprising:
- displaying information of the trajectory points connected by the constraint and associated with the constraint;
- displaying point cloud frames corresponding to the trajectory points; and
- displaying a resulting point cloud frame generated from a merging or an aligning operation of the point cloud frames corresponding to the trajectory points.

19. The computer-implemented method of claim 18, wherein the resulting point cloud frame is generated under a condition that the constraint is only partially satisfied, and the computer-implemented method further comprises:
- displaying a second resulting point cloud frame generated from a merging or an aligning operation of the point cloud frames under a second condition that the constraint is fully satisfied.

20. The computer-implemented method of claim 13, further comprising:
- receiving an indication to delete a constraint of the constraints;
- redetermining the position and the orientation of the sensor corresponding to the capture of each of the point cloud frames according to the deleted constraint; and
- depicting, on an interface, a graphical illustration of the redetermined positions at which the point cloud frames were captured.

* * * * *